United States Patent [19]

Wareham

[11] Patent Number: 5,191,960
[45] Date of Patent: Mar. 9, 1993

[54] AUTOMATED FASTERNER FEED SYSTEM FOR FASTENER ATTACHMENT DEVICES

[75] Inventor: Robert C. Wareham, Oakdale, Calif.

[73] Assignee: Haeger Corporation, Oakdale, Calif.

[21] Appl. No.: 775,727

[22] Filed: Oct. 11, 1991

[51] Int. Cl.⁵ .......................................... B65G 47/24
[52] U.S. Cl. ...................... 198/391; 198/389
[58] Field of Search ............... 198/389, 391; 221/159, 221/160

[56] References Cited

U.S. PATENT DOCUMENTS

| | | | |
|---|---|---|---|
| 2,858,930 | 11/1958 | Aidlin | 198/389 |
| 3,258,106 | 6/1966 | Booth | 198/391 |
| 3,275,120 | 9/1966 | Gardner | 198/389 |
| 3,288,267 | 11/1966 | Taylor et al. | 198/389 X |
| 3,521,735 | 7/1970 | Gallatin | 198/389 |
| 3,578,142 | 5/1971 | Burgess, Jr. | 198/391 X |
| 3,907,099 | 9/1975 | Smith | 198/389 |
| 4,236,302 | 12/1980 | Kuehling | 198/391 X |
| 4,348,806 | 9/1982 | Eves et al. | 198/391 X |
| 4,699,261 | 10/1987 | Nesin | 198/391 X |
| 4,739,873 | 4/1988 | Yajima | 198/391 |

FOREIGN PATENT DOCUMENTS

| | | | |
|---|---|---|---|
| 0262718 | 12/1985 | Japan | 198/389 |
| 0124417 | 6/1986 | Japan | 198/389 |

*Primary Examiner*—Robert P. Olszewski
*Assistant Examiner*—James R. Bidwell
*Attorney, Agent, or Firm*—John J. Leavitt

[57] ABSTRACT

Presented is an automated fastener feed system for feeding fastener elements such as threaded studs and nuts to a utilization device such as a press. The system includes a vibratory bowl into which the fastener devices are placed in an unoriented mass, and from which the fastener devices are fed into an orientation module that orients the fastener devices into the proper orientation to be delivered to the utilization device. Between the utilization device and the orientation module is a singulator module that receives the fastener devices, properly oriented, from the orientation device, and propels the fastener devices, either singly under manual operation, or continually under automatic operation, to the utilization device. A combination of pneumatic and electrical controls are utilized to control operation of the system.

18 Claims, 6 Drawing Sheets

FIG_1

FIG_2

FIG_3

FIG_12

FIG_13

AUTOMATED FASTERNER FEED SYSTEM FOR FASTENER ATTACHMENT DEVICES

BACKGROUND OF THE INVENTION

1. Field of the Invention

This invention relates to feed mechanisms for fasteners of the type that are applied to sheetmetal by various types of presses, and particularly to a modular autofeed system for feeding fasteners of various kinds to utilization devices.

2. Description of the Prior Art

The prior art as known includes the following United States patents, discovered as the result of a preliminary patentability and novelty search:

| | | |
|---|---|---|
| 2,514,851 | 2,856,998 | 3,044,072 |
| 3,069,933 | 3,339,799 | 3,851,743 |
| 4,722,647 | | 4,574,473 |

In the manufacture of end products for sale to the general public, particularly those that embody housings or components fabricated from sheetmetal panels, it is frequently necessary to attach to the sheetmetal panels fasteners of different types. Thus, in some instances, studs, threaded or otherwise, must be attached permanently to the panel so that components may be detachably secured to the sheetmetal panel. In other instances, relatively small receptors of elongated studs, such as square, hexagonal or circular fastener elements, must be permanently secured to the sheetmetal panel to detachably receive the shank of the elongated stud, be it threaded or not.

For efficient operation of a sheetmetal fabrication operation, it is necessary that the fasteners be fed to the utilization device in a properly timed sequence and in a proper orientation so that the utilization device, usually a press of the type described and illustrated in U.S. Pat. No. 4,391,358, owned by the owner of the present invention, through utilization of appropriate tooling, may secure the fastener in the proper location on the sheetmetal in a permanent manner. Feed mechanisms of various types have been devised to accomplish this purpose. However, most such feed mechanisms are expensive, complex in their operation, cumbersome, and difficult and time consuming to interchange with another feed mechanism when a different type fastener must be fed to the same utilization device. Accordingly, it is one of the objects of the present invention to provide a modular autofeed system that obviates these disadvantages of conventional feed mechanisms.

Because of the complexities of conventional fastener feed mechanisms, they are prone to malfunction, causing delay in the production of end products through time expended to correct the malfunction so that production may resume. Accordingly, a still further object of the present invention is the provision of a modular autofeed system for fasteners that is so simple and effective in its performance and construction as to be free of malfunction.

During the course of manufacturing a product utilizing sheetmetal panels, several different type fasteners are often used in the same end product. To change the fastener feed mechanism in conventional systems often encompasses an inordinate amount of time, during which time the utilization machine is out of service, and manpower must be utilized to effect the change. Therefore, a still further object of the present invention is the provision of a modular autofeed system in which the components required to be changed to feed different fastener elements are so efficiently interrelated that the interchange may be accomplished in about 1½ minutes.

Conventional feed mechanisms most often malfunction because one of the fasteners being fed through the mechanism is not properly oriented and therefore jams the mechanism. Yet another object of the invention is the provision of an orientation module for a modular autofeed system that initially properly orients the fastener elements to minimize the possibility of jamming of the fasteners, and to facilitate the clearing of such a problem if it occurs.

During the fabrication of products incorporating sheetmetal panels, and the permanent attachment to such panels of various types of fasteners, it is sometimes expedient to feed fasteners to the utilization device in a continual stream for use as fast as the utilization device can be cycled. In other instances, it is expedient to feed the fasteners one-by-one at a prescribed rate, or when called for by the operator of the utilization device. Accordingly, it is still another object of the invention to provide in a modular autofeed system for fasteners a singulator module that is selectively operable in either an automatic mode to feed a continual stream of fasteners, or in a manual mode to feed the fasteners one at a time to the utilization device.

One of the problems that persists in conventional fastener feed machines in the sheetmetal fabrication industry arises from the widely held concept that a "universal" feed mechanism that can be adapted to feed different types and styles of fasteners is more economical and therefore preferable to a modular design. Adherence to this "universal" concept requires that presses or utilization devices be shut down while the "universal" feeder mechanism is revamped, modified and adjusted to enable switching from one fastener to another. This takes time that could more effectively be used in the production of end products through use of the press or utilization device. Accordingly, a still further object of the invention is the provision of a modularized automatic fastener feed mechanism in which fasteners of any type are dumped into a vibrating bowl that causes feeding of the fasteners into an operatively associated orientation module designed for a specific fastener, which functions to orient the individual fasteners and feeds them into a singulator module designed for that particular fastener and operatively associated with the orientation module to receive one or a stream of fasteners therefrom and feed them one at a time or in a stream, properly oriented and in a timed sequence, or as called for, to the utilization device.

A still further object of the invention is the provision of multiple sets of cooperatively related orientation and singulator modules designed for operation together to handle specific types and styles of fastener elements, each set being cooperatively related to and functional with a vibrating bowl assembly that is common to all the different sets of orientation and singulator modules, and which enables removal of one set of orientation and singulator modules from the bowl and substitution of another set in less than about two (2) minutes.

A still further object of the invention is the provision of a feeder assembly including a vibrating bowl and orientation and singulator modules that may be interchanged without the use of tools.

The invention possesses other objects and features of advantage, some of which with the foregoing will be apparent from the following description and the drawings. It is to be understood that the invention is not limited to the embodiment illustrated and described since it may be embodied in various forms within the scope of the appended claims.

SUMMARY OF THE INVENTION

In terms of broad inclusion, the automated fastener feed system for fastener attachment devices of the invention comprises an apparatus adapted to be bolted directly to a side panel of a press or utilization device with which the mechanism is adapted to be used. The automated fastener feed system includes a vibratory bowl mounted on a platen, and activated by an appropriate 60 cycle AC motor that vibrates the bowl at a frequency and in a direction to advance fastener elements poured thereinto in a direction to be fed to the utilization device. Cooperatively and detachably mounted in association with the bowl, and mounted for vibration therewith, is an orientation module that initially receives the fastener elements, in whatever orientation they are presented through the orientation module, and reorients the fasteners into a proper orientation to be fed into a cooperatively and detachably associated singulator module that includes pneumatically operated mechanism for dispatching the fasteners from the singulator module directly to the utilization device. Pneumatic and electrical means are provided for controlling the system, including an on-off switch, a pressure regulator, an air distribution valve operable in either an automatic mode or a manual mode to propel fasteners automatically through the singulator and to the utilization device, or manually in a one-by-one manner, at the option of the operator of the utilization device. It is notable that the orientation module and the singulator module may be independently removed from the assembly, and replaced by other orientation and singulator modules that are designed to receive, orient and propel a different type of fastener element.

DESCRIPTION OF THE PREFERRED EMBODIMENT

Figure 1:
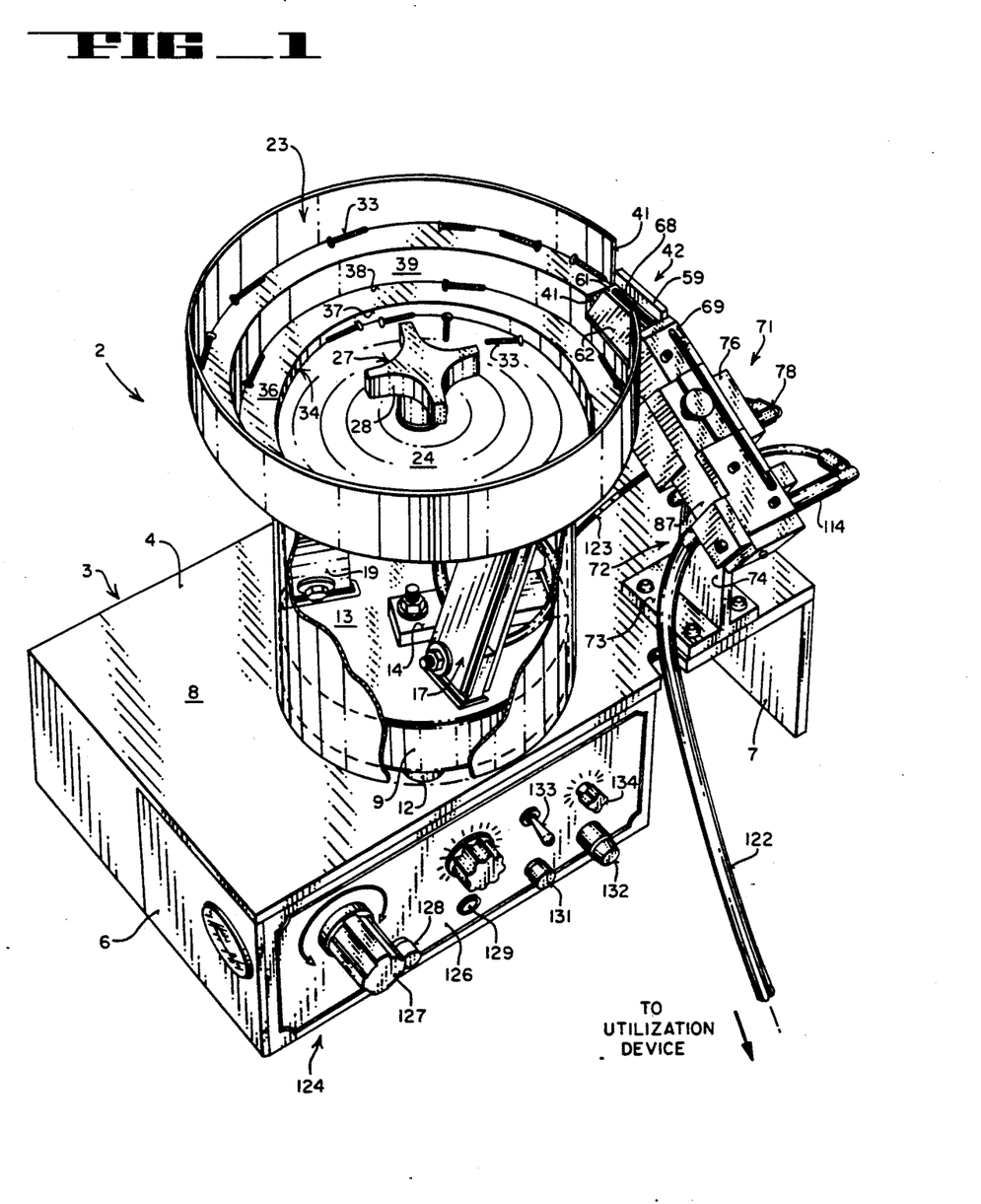
FIG. 1 is a perspective view illustrating the automated fastener feed system for fasteners apart from the utilization device to which the fasteners are to be fed.

In terms of greater detail, the automated fastener feed system of the invention is illustrated in FIG. 1, and is there designated generally by the numeral 2. The system as a whole is a composite of various discrete components and is intended for attachment to and operation with several different types of utilization devices, such as the Haeger Press HP6-C and the presses of other machinery manufacturers that require delivery of fastener elements to a working tool head. Among the discrete components making up the system illustrated is a heavy steel housing or enclosure designated generally by the numeral 3, and including a top mounting panel 4 integral with end panels 6 and 7, the end panel 7 providing appropriate mounting holes (not shown) through which appropriate high strength bolts may extend to detachably mount the system on a side panel of the press or other utilization device. It should be noted that the steel housing is fabricated from steel plate sufficiently thick that the box-like housing may be mounted from one end plate, plate 7 for instance, and project cantilever-like from the supporting utilization device without undue stress being placed on the union of the two assemblies.

Mounted on the upper surface 8 of the top mounting panel 4 is a heavy steel main base plate 9 securely, yet detachably fastened to the top mounting panel by appropriate high strength bolts (not shown) and rubber or synthetic resinous vibration damping isolator members 12. Preferably, there are four such isolator members interposed between the top panel 4 and the heavy main base plate 9 spaced circumferentially adjacent the outer periphery of the plate 9 at 90° intervals to provide a stable yet resilient support for the base plate 9.

Mounted on the top surface 13 of the base plate 9 is a motor mounting bracket 14 including an upwardly extending column (not shown) on the upper end of which is detachably supported an electric motor (also not shown) which, when energized, imposes a reciprocating force on the broad side of an armature plate. One end of the armature plate is welded to the underside of vibratory plate 16. Cooperating with the motor and armature plate to vibrate the vibratory plate at a selected frequency in a horizontal plane is a resilient spring assembly designated generally by the numeral 17. The spring assembly extends upwardly at an angle between the top surface 13 of the base plate 9 and the underside 18 of the vibratory plate 16. An additional vibratory plate support column 19 is provided as shown.

Figure 3:
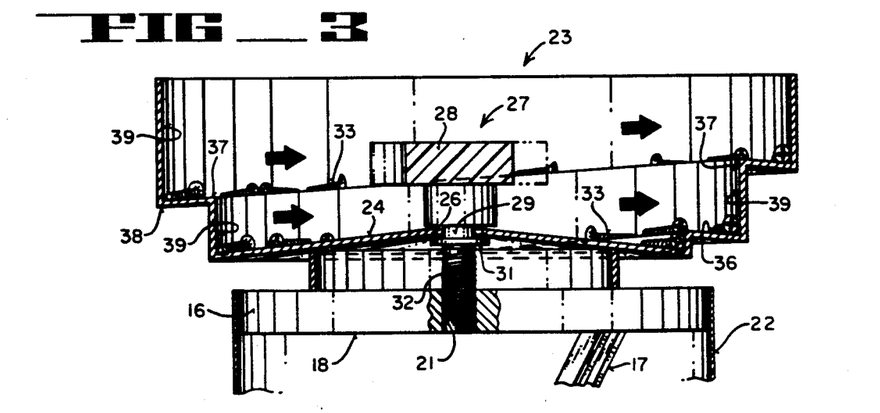
FIG. 3 is a fragmentary vertical cross-sectional view taken in the plane indicated by the line 3—3 in FIG. 2.

As a result of this construction, which is generally conventional and is not claimed here, the vibratory plate 16 is caused to vibrate in a manner that can be controlled as to its frequency and direction of vibration for a purpose which will hereinafter be explained. As illustrated in FIG. 3, the vibratory plate 16 is preferably circular and is provided with a centrally located threaded aperture 21. Surrounding the vibratory plate and its mounting assembly is a cylindrical shell 22 that serves to protect the motor and vibratory assembly against dust, and which serves also as a shroud to damp the sound generated by the vibrating members contained within the shell.

Detachably mounted on the vibratory plate 16 is a vibratory bowl designated generally by the numeral 23. The vibratory bowl is preferably fabricated from stainless steel sheet formed to provide a bottom surface 24 having a central aperture 26, in which is rotatably mounted a bowl attachment assembly designated generally by the numeral 27 and including a digitally manipulable knob portion 28 extending into the bowl, a smooth shank portion 29 journaled in the aperture 26, a lock ring 31 secured about the shank portion 29 to rotatably lock the attachment assembly to the bowl, and a threaded shank portion 32 extending below the lock ring and adapted to threadably engage the centrally disposed threaded aperture 21 in the vibratory plate 16 to attach the bowl assembly thereto. By such attachment, it will be understood that when the vibratory plate vibrates, at whatever frequency is selected, and in whatever direction, the bowl assembly will vibrate at the same frequency and in the same direction.

Figure 2:
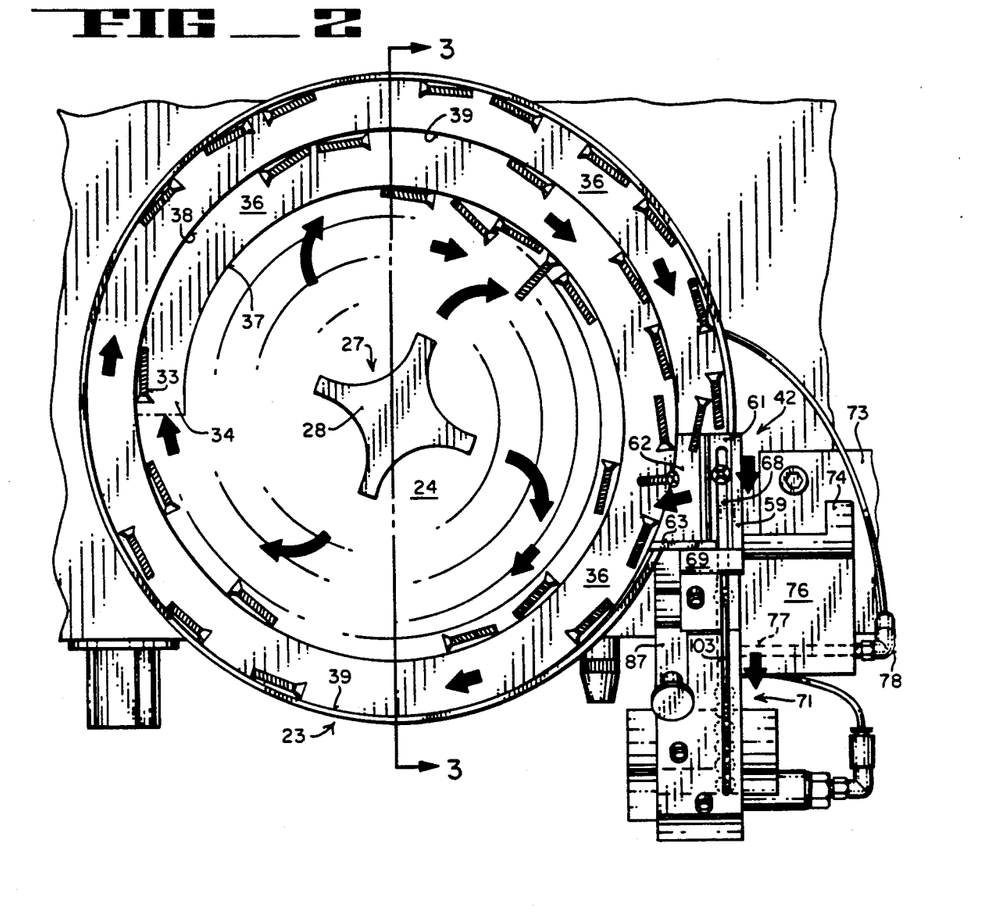
FIG. 2 is a plan view of the automated fastener feed system illustrated in FIG. 1.

Referring to FIG. 3, it will be seen that the bottom wall 24 of the bowl 23 is slanted radially outwardly from the central aperture so that fasteners 33 deposited in the bottom of the bowl will migrate radially outwardly toward the outer periphery of the bottom wall and will also be caused to migrate circumferentially in a clockwise direction in relation to the vibrating bowl as indicated by the arrows in FIGS. 2 and 3. Integrally formed with the bottom wall 24 is a circumferentially and spirally ascending track 34, the bottom wall 36 of which is, like the bottom 24, slanted radially outwardly from its inner periphery 37 toward its outer periphery 38. The outer periphery of the track is integral with a gradually circumferentially ascending wall portion 39 against which the fastener elements 33 abut to stop their radially outward migration due to vibratory movement of the bowl within which they are contained.

Figure 4:
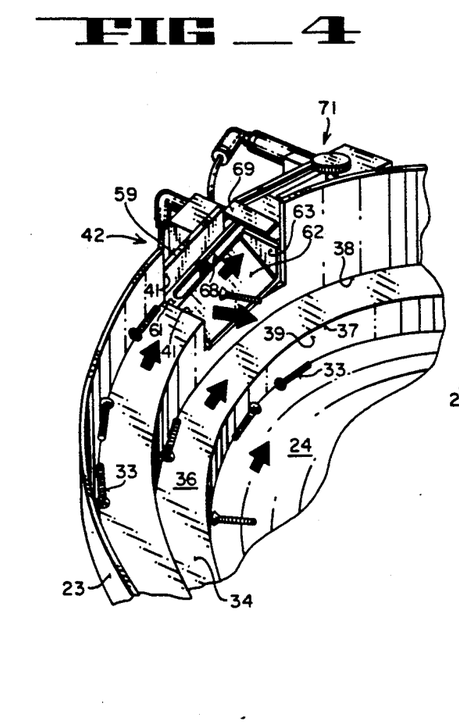
FIG. 4 is a fragmentary perspective view illustrating the manner in which elongated threaded fastener elements enter the orientation module and pass therefrom into the singulator module with excess fastener elements being returned to the vibratory bowl for migration back to the orientation module.

As illustrated in the drawings, the fastener elements start their journey of migration at the lowest point in the bowl, and gradually climb to a higher elevation along the spirally ascending track 34. Ultimately, the migrating fastener elements reach a discontinuity or gap 41 in the track 34 and the side wall 39 as clearly illustrated in FIGS. 4 and 7. Within the confines of this discontinuity or gap, there is detachably mounted an orientation module designated generally by the numeral 42 (42').

The orientation module is a monolithic member fabricated with great exactitude to close dimensional tolerances and fits precisely within the gap 41 so as to fill the gap and to provide surfaces that cooperate with the surface of the track 34 and the side wall 39 that surrounds its outer periphery. Specifically, the orientation module is designed to receive fastener elements that migrate into the gap, more precisely onto the orientation module, and to orient such fasteners so that they may continue their journey to the tool head in the proper orientation for efficient attachment to the sheet-metal workpiece.

The orientation module is detachably supported on the bowl structure by means of a heavy metal plate 43 welded securely to the underside of or bottom wall 36 of the next lower track below the gap 41 as shown in FIGS. 6, 9, 10 and 11. The heavy support plate 43 is provided with two upwardly projecting laterally spaced guide or alignment pins 44 and 46 (FIGS. 10 and 11) welded to and projecting from the upper surface 47 of the plate 43 as shown. Also mounted on the plate 43, is a rotatable orientation module attachment spindle 48 having a threaded stud portion 49 extending through the plate 43 between the two alignment or guide pins 44 and 46, and having a digitally manipulable knob 51 by which the orientation module attachment spindle may be rotated to threadably and detachably engage the threaded stud portion 49 with the orientation module.

Figure 10:
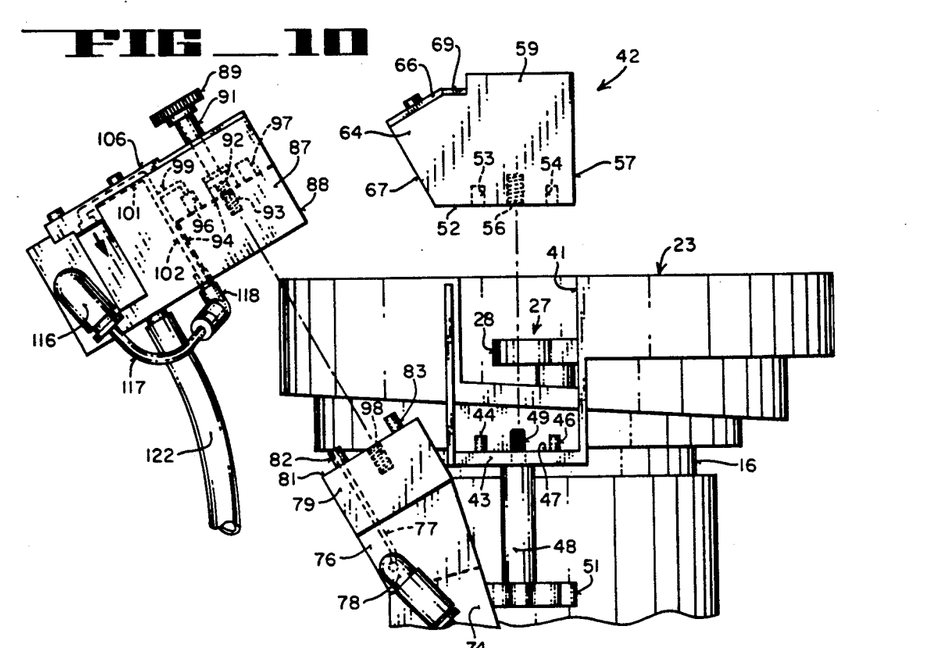
FIG. 10 is an elevational view in exploded form illustrating the vibratory bowl mounted on its support structure, the orientation module exploded from its normal operative position, and the singulator module also exploded from its normal operative position. The orientation and singulator modules illustrated in this figure pertain to elongated threaded fastener elements.
Figure 11:
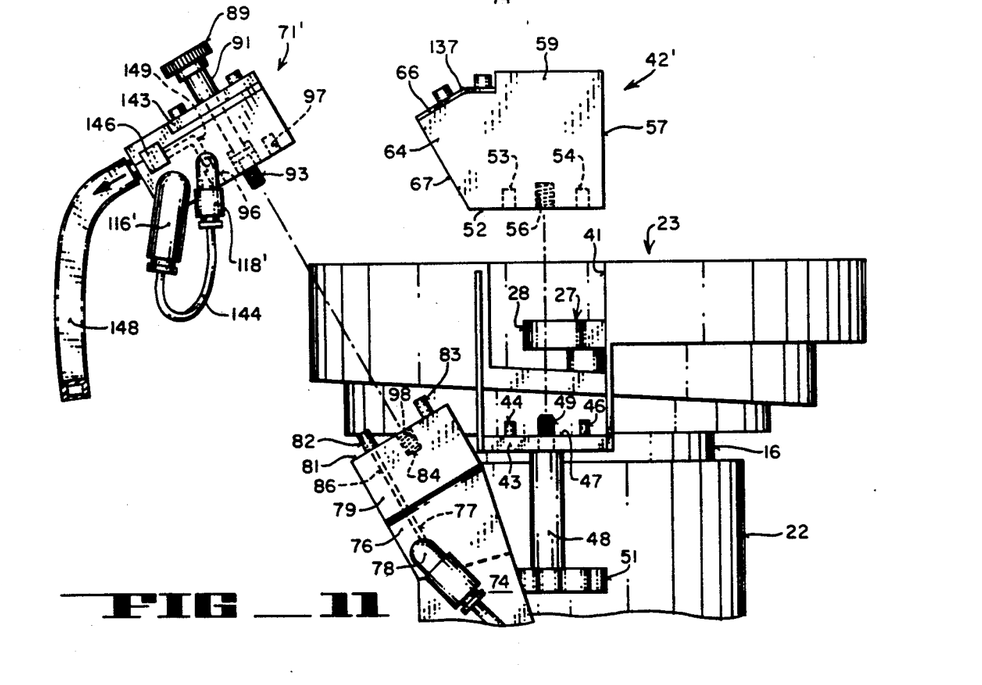
FIG. 11 is a view similar to FIG. 10, but showing the orientation module and singulator module exploded from their normal operative positions, these elements being correlated to use for propelling fastener elements constituting nuts as illustrated in FIGS. 7-9.

In this regard, the orientation module 42, as viewed in FIGS. 10 and 11, is fabricated from a single monolithic block of tool steel to provide a bottom surface 52 having laterally spaced bores 53 and 54 spaced and dimensioned to snugly receive the alignment or guide pins 44 and 46. The bottom surface 52 of the orientation module is also provided with a threaded bore 56 adapted to threadably receive the threaded stud portion 49 of the spindle 48. It will thus be seen that when the orientation module 42 is detachably yet solidly anchored on the top surface 47 of the support plate 43 by threaded engagement of the threaded stud portion 49 with the threaded bore 56 and engagement of the alignment pins 44 and 46 with the complementary bores 53 and 54 of the orientation module, the bottom surface 52 of the orientation module lies tightly pressed against the top surface 47 of the plate. The orientation module may be quickly attached or detached and removed simply by rotating the spindle 48 without the need of tools, and when it is removed and replaced, it will resume the exact position it was in when it was removed, reestablishing the same relationship between surfaces of the orientation module and the associated and cooperating surfaces of the bowl 23.

Regarding such cooperating surfaces, and referring to FIGS. 6, 9, 10 and 11, it will there be seen that when the orientation module is mounted on the plate 43, the rear or right hand surface 57 of the monolithic orientation module snugly abuts the interrupted edge 58 of the bowl that forms the discontinuity or gap 41 in the track 34 and its side wall 39. Additionally, the orientation module is provided with an upwardly extending flange 59 that corresponds in thickness with the thickness of the interrupted peripheral wall member 39, and immediately adjacent the flange, the orientation module is provided with a flat horizontal top surface portion 61 that commences coincident with the rear surface 57 and continues for a substantial portion of the length of the orientation module.

In FIGS. 1, 2, 4, 5, 7 and 8, it will be seen that the flat horizontal top surface portion 61 is narrow compared to the width of the fastener track 34 with which it is associated, and that from the inboard edge of the horizontal top surface portion 61, a portion 62 of the top surface slants sharply downwardly and laterally toward the fastener track below at an angle of about 30° to the horizontal. From the drawings it will be seen that if the fasteners are fed to the orientation module too fast, the excess fasteners slide down the laterally slanted top surface portion 62 and fall onto the spiral track 34 below to again continue their migration toward the orientation module location. At its downstream end, the laterally slanted top surface portion 62 terminates at an abutment wall 63 that coincides with the opposite end of the interrupted bowl wall that forms the gap 41, and the top surface of the orientation module then continues tangentially at substantially full thickness in an extended portion 64 the top surface 66 of which merges integrally with the flat horizontal top surface 61, but slants forwardly or longitudinally in relation to the longitudinal dimension of the orientation module. The forwardly slanted surface 66 is interrupted by the forward end edge or surface 67 of the orientation module which, as seen in FIGS. 10 and 11, is slanted upwardly to meet the slanted upper surface 66 at virtually a 90° angle.

Figure 5:
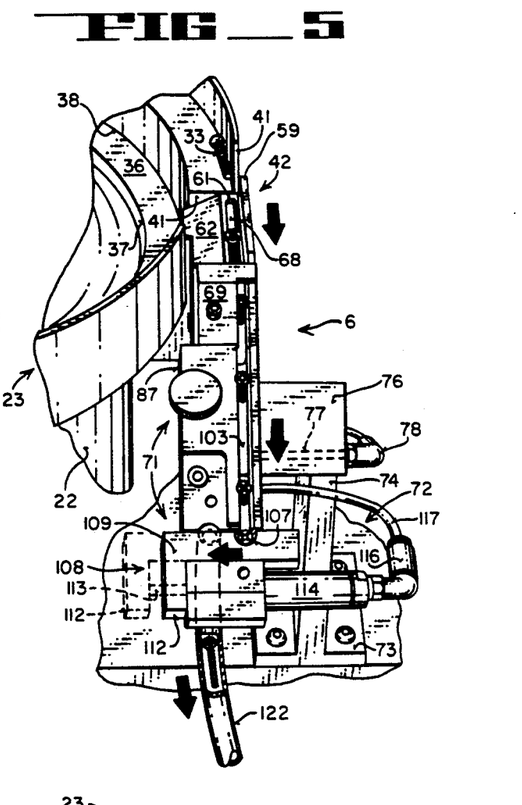
FIG. 5 is a fragmentary perspective view in plan, showing the relationship between the orientation module and the vibratory bowl, and the relationship of the singulator module with the orientation module, and illustrating also the manner of dispatching the fastener elements from the singulator module to the utilization device.
Figure 6:
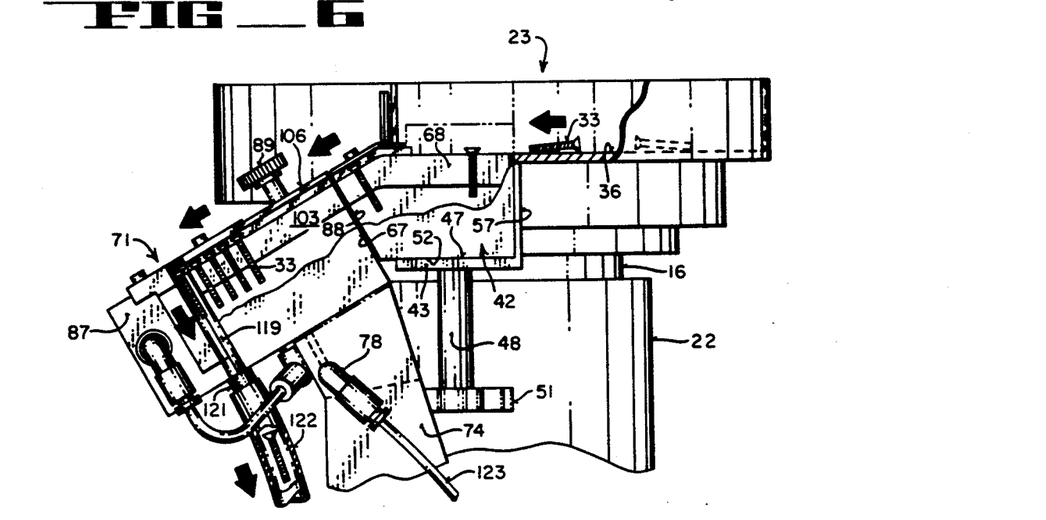
FIG. 6 is a side elevational view taken in the direction indicated by the arrow 6 in FIG. 5, and illustrating the manner in which fastener elements of an elongated type, such as threaded studs, are transferred from the vibrating bowl to the orientation module, and from the orientation module to the singulator module, and thence ejected from the singulator module and propelled to the utilization device.

Referring to the orientation module 42 illustrated in FIGS. 1, 2, 4, 5 and 6, it will be seen that the upper flat narrow horizontal surface 61 is provided with an elongated slot that extends from adjacent the flat surface 61 to the opposite end surface 67 of the orientation module. Where the slot 68 intercepts the flat surface 61, the width of the slot is dimensioned so that when the elongated fastener elements 33 progress longitudinally along the slot, the shank of the fastener elements will drop into the slot while the head of the elongated fastener element will prevent the fastener element from dropping all the way through the slot, which continues through the body of the orientation module and intercepts the bottom surface 52 along side, i.e., parallel to the alignment bores 53 and 54. Where the top surface of the orientation module makes the transition from a horizontal surface to an inclined surface 66, there is attached over the slot 68 a retainer plate 69 below which the elongated fastener elements pass along the slot 68, urged first by the vibratory action of the bowl, and when they reach the slanted transition formed in the extended portion 64 of the orientation module, urged also by gravity. As illustrated in FIG. 6, the depth of the slot 68 is such as to easily accommodate the full length of the elongated fastener element 33. It is also important to note that it is not necessary that the elongated fastener elements 33 approach the slot 68 in a shank-first orientation. Even if the elongated fastener elements approach the slot head-first, the fastener elements will progress along the slot until such time as the trailing end of the shank clears the flat surface 61 and drops into the slot, thus again orienting the elongated fastener element so that it depends vertically in the slot 68 as illustrated in FIG. 6. It should also be noted that the retainer plate 69 provides sufficient clearance between its underside and the top surface 66 of the inclined portion of the orientation module so as to retain the elongated fastener elements perpendicular to the longitudinal dimension of the slot as illustrated in FIG. 6. This is accomplished by the space between the underside of the retainer plate and the top surface 66 being gauged to retain the flat upper surface of the fastener element head parallel with the undersurface of the retainer plate as shown.

It is important to note at this point that the orientation module 42 that is illustrated in FIGS. 1 through 6 is somewhat different from the orientation module illustrated in FIGS. 7 through 10. The difference lies in the necessity of the orientation module illustrated in FIGS. 1 through 6 to accept an elongated fastener element 33, thus requiring the slot 68 through which the shank of the elongated fastener element passes, while the orientation module 42' illustrated in FIGS. 7 through 10, is adapted to orient relatively flat cylindrical fastener elements such as threaded nuts as will hereinafter be explained.

Figure 7:
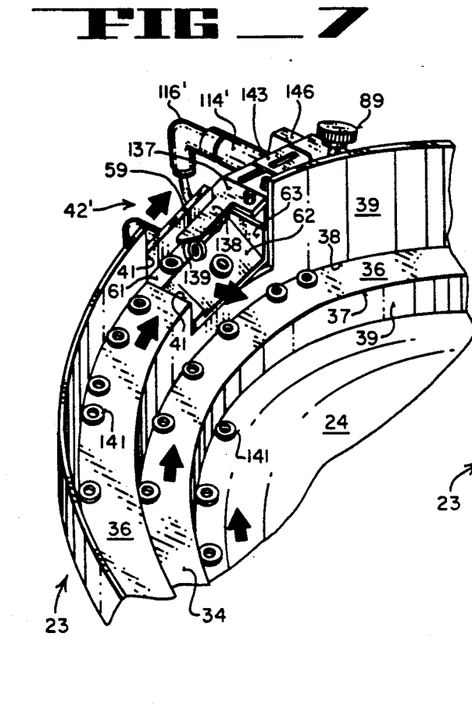
FIG. 7 is a fragmentary perspective view similar to FIG. 4, but illustrating cooperating orientation and singulator modules of the type for handling fastener elements in the form of threaded nuts instead of elongated threaded studs.
Figure 8:
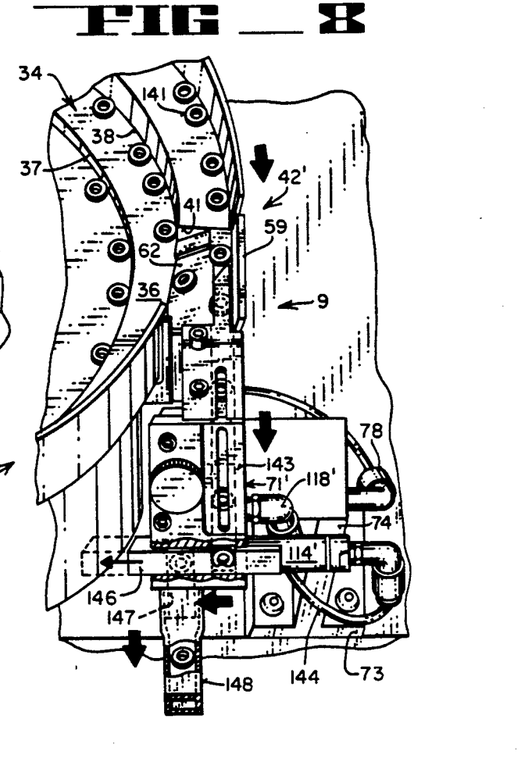
FIG. 8 is a fragmentary perspective view in plan similar to FIG. 5, but showing the orientation module and singulator module of the type illustrated in FIG. 7 for the purpose of handling fastener elements in the form of threaded nuts.
Figure 9:
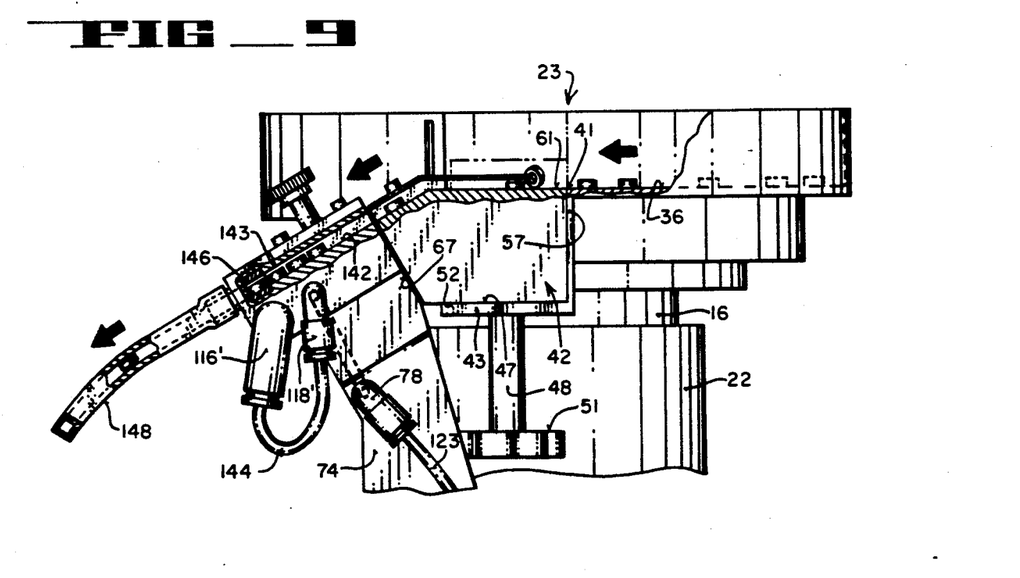
FIG. 9 is a side elevational view taken in the direction indicated by the arrow 9 in FIG. 8, and illustrating the relationship between the vibratory bowl, the orientation module for receiving flat cylindrical threaded nuts, and the cooperatively associated singulator module that propels the threaded nuts through an appropriate delivery tube to the utilization device.

From the orientation module 42 and 42', the fastener elements, whether they be elongated threaded fastener elements such as 33 as illustrated in FIGS. 1 through 6, or whether they be flat cylindrical threaded nuts as illustrated in FIGS. 7 through 9, pass into and through singulator modules designated generally by the numerals 71 and 71', the singulator module 71 being applicable for handling elongated stud-type fastener elements such as 33 in FIGS. 1 through 6, while the singulator module 71' is adapted to receive and transport relatively flat threaded nuts such as the nuts illustrated in FIGS. 7 through 9. As illustrated in FIGS. 1, 2, 5, 6, 9, 10 and 11, the singulator modules 71 and 71' are supported on an upwardly extending pedestal designated generally by the numeral 72 and detachably mounted on the top surface 8 of the housing 3. The pedestal includes a base member 73 secured by appropriate bolts to the top mounting panel 4 of the housing, and from the base member 73 there rises upwardly a plate member 74. At its upper end, the plate 74 supports a transversely extending manifold plate 76 that extends inwardly toward the periphery of the bowl and which includes an air passageway 77 therethrough suitably connected to the air fitting 78 as shown. At its end opposite its attachment to the vertical plate 74, the manifold plate is provided with an upwardly extending manifold extension and mounting bracket 79, the mounting bracket being tilted to the left as viewed in FIGS. 1, 2, 5, 6, 8, 9, 10 and 11 as shown. The upper surface 81 of the manifold extension and mounting bracket is provided with a pair of spaced alignment pins 82 and 83, for a purpose which will hereinafter be explained. Also formed in the mounting bracket 79 is a threaded bore 84. Preferably, the alignment pin 82 is centrally bored so that it communicates with an air passageway 86 rising through the mounting bracket 79 as shown in FIGS. 10 and 11, and thus communicating with the passageway 77 in the transversely extending manifold plate 76, which in turn communicates with the air fitting 78.

The singulator module designated generally by the numeral 71 illustrated in FIGS. 1 through 6, comprises a monolithic body designated generally by the numeral 87 and fabricated from tool steel heat treated for hardness characteristics and for dimensional stability.

The singulator module block 87 is provided with an end face 88 adapted to be closely adjacent but not abut the end face 67 of the orientation module when the singulator module body is detachably secured to the mounting bracket 79 by appropriate manipulation of the thumb screw 89. As indicated in FIGS. 10 and 11, the thumb screw 89 includes a shank portion 91 that penetrates through the body of the singulator module and is rotatably mounted therein but retained against release by an appropriate split spring ring 92, the threaded end portion 93 of the thumb screw 89 projecting into a generally rectangular notch formed in the backside of the body 87 as viewed in FIG. 10, and defined by the broken lines 94. Thus, when the singulator module 71 is superimposed over the upwardly extending mounting bracket 79, the alignment pins 82 and 83 extend into alignment bores 96 and 97 formed in the upper surface of the notch, while the threaded end 93 of the thumb screw 89 penetrates and threadably engages the complimentarily threaded bore 98 formed in the outwardly extending mounting bracket 79 as shown. It will thus be seen that the singulator module, when the thumb screw 89 is tightened, sits very rigidly and securely and properly aligned on the mounting bracket 79, with its leading edge 88 closely associated but not touching the trailing edge 67 of the associated orientation module. The near side surface of the mounting bracket 79 as viewed in FIG. 10 also lies snugly abutting the complimentary surface of the notch defined by the broken lines 94, to add stability to the detachable union between the singulator module and the mounting bracket 79. It will thus be seen that the singulator module in its entirety may be easily and quickly attached and detached from the mounting bracket 79 merely by manipulating the thumb nut 89 to either engage the threaded bore 98 or to release the threaded portion 93 of the spindle therefrom. It should also be noted that the alignment pin 82 is bored to communicate with the air passage 77, and the recess 96 in the singulator module in which the alignment pin 82 is received, is also connected by an air passageway 99 which branches off into a passageway 101 and a passageway 102 for distribution of air in a manner which will hereinafter be explained.

Referring now to FIGS. 5 and 6, it will be seen that as the elongated fastener elements 33 pass to the left in FIG. 6 through the slot 68 and continue down the inclined portion 64 of the orientation module, the heads being trapped under the cover plate 69, they eventually come to the transition between the orientation module and the singulator module, these being the two closely adjacent surfaces 67 and 88, respectively, and the elongated fastener elements continue along a slot 103 formed in the top surface 104 of the singulator module, shown in FIG. 5 with the cover plate 106 removed for clarity in this description. Referring to FIG. 6, as the elongated fastener elements move beneath the cover plate 106 through the slot 103, they are propelled down the slanted singulation module by gravity and by the vibration that is transferred to the singulation module from the vibrating feeder bowl. As shown in FIG. 5, when one of the elongated fastener elements reaches the bottom of the slot 103, it lies in a semi-cylindrical nacelle 107 formed in one surface of the transversely slidable singulator bar designated generally by the numeral 108. The singulator bar includes a main body portion 109 within which the nacelle 107 is formed, and within which nacelle is received, individually, one of the elongated fastener elements 33. The singulator bar also includes a right angle extension 112 connected to one end of the ram 113 slidably disposed in an air cylinder 114 mounted on the side of the singulator body, the air cylinder 114 being provided with air through a fitting 116 connected by a tube 117 to the fitting 118 which is in turn connected to the air passage 102 within the singulator body. It will thus be seen that air selectively admitted through the air fitting 78 passes through the alignment pin 82, into the air passage 99 and from thence into the air passage 102, the air fitting 118, air tube 117 and into the air cylinder 114.

Again referring to FIG. 5, it will be seen that in the position of the singulator bar 108 shown in full lines, the singulator bar extension 112 abuts the body of the singulator and it is held in this position by an appropriate spring within the air cylinder 114. However, when pressurized air is admitted to the cylinder 114, the body 109 of the singulator moves to the left as indicated by broken lines, and carries with it the fastener element 33 that is nesting in the nacelle 107. The travel of the body 109 of the singulator bar is controlled so that the elongated fastener element 33 resting in the nacelle 107 is carried laterally to the left as viewed in FIG. 5, until it becomes superimposed over a downwardly extending passageway 119 terminating in a fitting 121 to which is attached a delivery tube 122 the other end of which terminates at the tool to which the fastener element 33 is delivered for attachment to the end product being fabricated. It should be understood that while the air admitted through the alignment pin 82 energizes the air cylinder 114, it simultaneously passes through the air passage 101 contained beneath the cover 106 of the singulator, and pressurizes a chamber above the delivery position of the elongated fastener element, to thus forcefully with air pressure drive the elongated fastener element 33 through the passageway 119 and through the delivery tube 122 to the utilization device.

Air is delivered to the singulation module through the fitting 78 that constitutes a permanent fitting on the mounting bracket for the singulation module, and need not be disconnected when the singulation module is removed for replacement by another. Thus, all that is required to remove one singulation module and replace it with another is that the thumb nut 89 be loosened, the delivery tube 122 be disconnected from the tool to which it is attached, and the singulation module lifted from the alignment pins 82 and 83. Conversely, with one singulation module removed, and the alignment pins 82 and 83 exposed as illustrated in FIG. 10, all that is required to attach another singulation module is that it be superimposed over the alignment pins 82 and 83 and the thumb nut 89 tightened to engage the threaded end 93 with the bore 98. Since each singulation module carries its own delivery tube, all that is required once the substitute singulation module is in place is that the end of the delivery tube remote from the singulation module be connected to the utilization device.

To provide air to the singulation module, the fitting 78 is connected by an appropriate air line 123 to a source of such air delivered through appropriate means into the control box designated generally by the numeral 124 and detachably supported within the housing 3. Referring to FIG. 1, it will there be seen that the control box or control module includes a face plate 126 on which are mounted an air pressure regulator knob 127 rotatable as indicated by the arrow to minimize or maximize the air pressure, and a manual eject button 128 that may be manually operated to impose separate puffs of air to the air cylinder 114 to individually deliver fastener elements from the singulator module to the delivery tube 122. Also contained on the face plate 126 and controlling elements of the electrical and pneumatic circuit contained within the control box, is a light 129 that indicates whether the power switch 131 is ON or OFF, a fuse capsule 132, a switch 133 to select either a continuous mode of operation or an intermittent mode of operation, and a timer device 134 that regulates the time interval between delivery of fastener elements.

As indicated above, one of the virtues of the modular autofeed system for fasteners forming the subject matter hereof is that the vibratory bowl, the orientation module and the singulator module are so related that the orientation module and singulator module may be interchanged for other orientation modules and singulator modules for specific fastener elements very simply, without the use of tools, and in an inordinately short interval of time.

To exemplify this facility, reference is made to FIGS. 7-9 and 11 in which there is shown associated with the same vibratory bowl structure 23 a substituted orientation module 42' adapted to receive and orient a succession of relatively small annular threaded nuts adapted to be delivered to the singulation module designated generally by the numeral 71'. In the interest of brevity in this description, only those elements that are different in the orientation module 42' and the singulation module 71' will be described herein, and elements previously described will be designated by the same reference numerals.

Thus, referring to FIGS. 7, 8 and 9, it will be seen that the orientation module 42' is devoid of the slot 68 required in the orientation module for elongated fastener elements, and instead, the elongated flat horizontal surface 61 extends the full length of the orientation module in a longitudinal direction until the surface 66 of the orientation module starts its downward slant as indicated in FIG. 11. Mounted on the top surface of the orientation module is a cover plate 137 including an elongated finger portion 138 extending over the flat horizontal surface portion 61 cantilever-like, and on its free end having a tapered end surface 139 which intercepts fastener elements 141 that are not properly oriented, as indicated in FIG. 7. As there shown, the fastener elements that are not oriented properly impinge against the tapered end surface 139 and are caused to be deflected laterally, to fall onto the sloping surface 62 as previously described. The deflected fastener elements fall onto the next lower track 34, and are again caused by vibration of the bowl to migrate back to the orientation module.

Properly oriented nuts 141 pass under the elongated finger member 138, slide down the inclined surface 66 beneath the cover plate 137 as shown, and pass onto the top surface of the singulator module 71'. It should be noted that, as previously explained, the end surface 67 of the orientation module lies closely adjacent the associated end surface of the singulator module so that the passage of the nuts 141 from the orientation module to the singulator module is unimpeded and uninterrupted. As before, the top surface of the orientation module and the top surface of the singulator module are flush with each other. The nut 141 slides over the top surface 142, passing under the singulator cover plate 143. As shown, both the cover plate 137 on the orientation module and the cover plate 143 on the singulator module are slotted to permit visual observation of the fastener nuts as they pass through the system.

To aid in the passage of the fastener nuts from the singulator module 71' to the utilization device (not shown), air under pressure is again channeled through the hollow alignment pin 82 and passes into the alignment recess 96 (FIG. 11) from whence it passes through the air fitting 118' connected to an appropriate air line or tube 144. The end of the air tube remote from the fitting 118' terminates in fitting 116', which is in turn connected to the inlet port of the air cylinder 114' mounted on the singulator module as shown. The air cylinder, through extension of its ram (not shown) by the admission of air to the cylinder effects lateral displacement of a slotted singulator bar 146 slidably mounted on the body of the singulator module as shown. In the position of the singulator bar shown in full lines in FIG. 8, the notch in the bar receives a fastener nut 141 as shown, and when air pressure is applied to the cylinder, the singulator bar is caused to move to the left as indicated in broken lines, and the nut is carried with the bar to the left, where it is placed in coincidence with the channeled entry of the transport channel 147. Connected to the transport channel is an elongated delivery tube 148 having a rectangular cross-sectional configuration that accepts the circular fastener nuts and which guides them to the utilization device.

It should be noted that the air passage that connects with the recess 96 and the hollow alignment pin 82 continues beyond the fitting 118' in a passageway 149 as shown in broken lines, and terminates in the channel in which the singulator bar is slidably disposed. The orifice of the passageway 149 in the singulator bar channel lies opposite the entrance to the transport channel 147. Thus, when a nut 141 rests in the notch in the singulator bar opposite the entrance to the transport channel, a puff of air under pressure is released behind the nut and causes it to be propelled with considerable force into and through the delivery tube.

Figure 12:
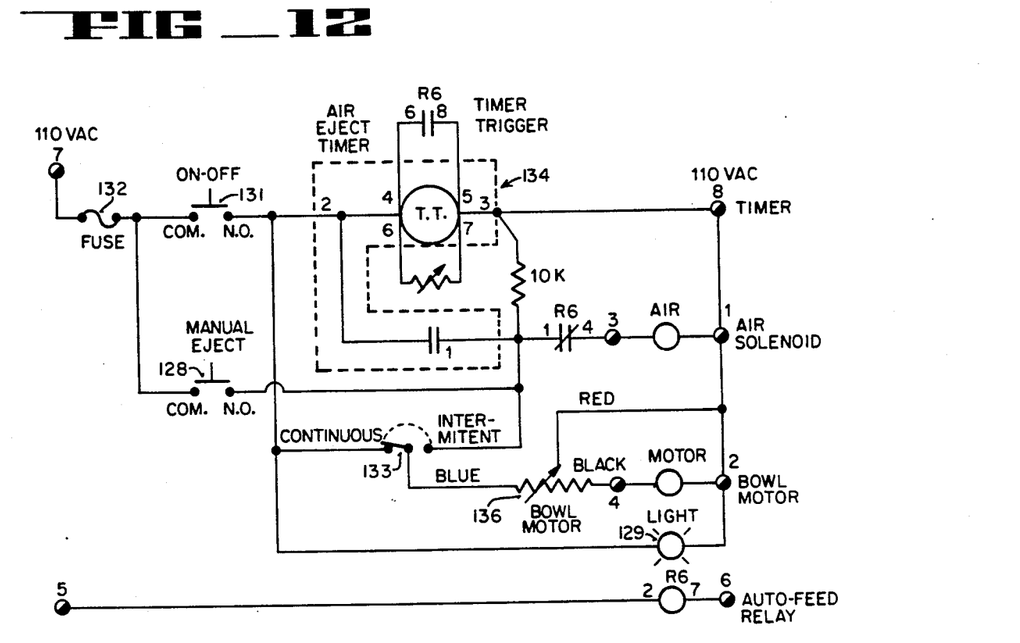
FIG. 12 is a schematic of the electrical control circuit for operating the modular autofeed system of the invention.
Figure 13:
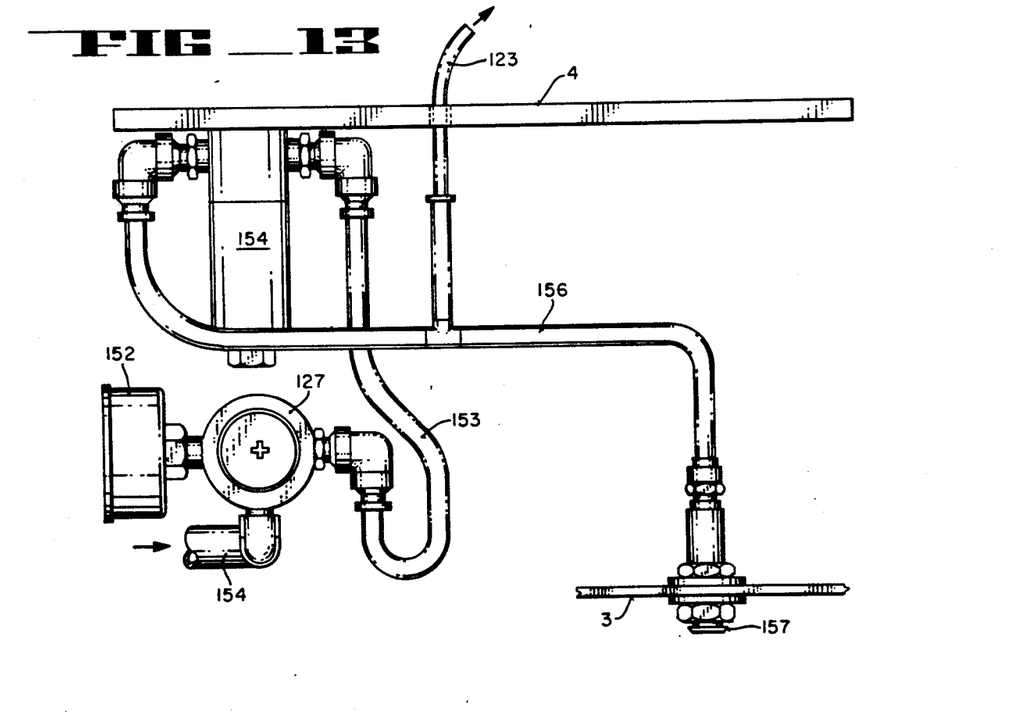
FIG. 13 is the pneumatic circuit utilized in operating the modular autofeed system of the invention.

For a complete understanding of the operation of the modular autofeed system described above, reference is made to the electrical schematic illustrated in FIG. 12, and to the pneumatic circuit illustrated in FIG. 13. In the interest of brevity in this description, it is noted that the reference numbers applied to control panel 126 illustrated in FIG. 1 have been applied to the corresponding components illustrated in FIG. 12. Thus, the system is powered by a 110 volt alternating current control circuit including the ON-OFF switch 131, and fuse 132. When the main power switch 131 is turned ON, the green power light 129 is illuminated and the vibratory bowl motor is energized, causing any fasteners within the bowl to start a clockwise migration up the track 34. It should be noted that the vibratory motor control includes a switch 133 which normally resides in the continuous vibration mode, but which may be shifted to an intermittent mode. When the feeder mechanism is operating in the intermittent mode, the bowl only vibrates enough to load one fastener into the delivery tube and then the vibration stops until the next cycle is initiated. It should also be noted that manipulation of the motor control knob allows control of the frequency of vibration of the bowl, thus controlling the speed at which the fasteners are fed to the orientation module. When it is desired to blow single fasteners down the delivery tube, the manual eject button 129 is pressed at whatever frequency it is desired to deliver the fasteners one at a time. For control of the length of time of the ejection cycle when operating in either the continuous or intermittent mode, there is provided a solid state timer 134 having a control knob that may be rotated to set the interval between cycles.

Referring to FIG. 13, it will be seen that the pneumatic circuit is simple in concept and structural arrangement, but very effective in operating the modular autofeed system of the invention in conjunction with the electrical circuit illustrated in FIG. 12. Air under pressure is admitted to the circuit through an air inlet tube 151 that terminates in the air regulator valve 127, the knob of which need only be rotated to adjust the degree of pressure admitted to the system. A gauge 152 is provided to indicate the degree of pressure. From the regulator valve 127, air is channeled through tubing 153 to the solenoid-operated air valve 154 ordinarily controlled in the frequency of its operation by the timer 134, but operable also in a one-shot mode by depression of the normally open manual eject switch 128. Air from the valve 154 is channeled through tubing 156 to a quick connect and disconnect fitting 157 mounted on the housing wall 3. This fitting may be optionally used by operators that wish to connect a source of air to a bottom feeder mechanism mounted on the press. The air line 123 that is connected to the singulator module air fitting 78 is connected into the tubing 156 so as to provide a source of air to the singulator.

From the foregoing it will readily be understood that the modular autofeed system of the invention fills a long-felt need for a fastener feed mechanism for presses that can be quickly and easily interchanged with a minimum of downtime for the press. Its modular characteristics enables the interchange of different orientation modules and singulator modules with a common vibratory bowl to handle a myriad of different type fastener elements, each correlated to specific orientation and singulation modules that may be mounted in cooperative association with one another and with the vibratory bowl that is common to both.

Having thus described the invention, what is believed to be new and novel and sought to be protected by letters patent of the United States is as follows.

I claim:

1. An automated fastener feed system for fastener attachment devices required to be delivered to a utilization device, comprising:
    a) a bowl having an outer periphery for receiving a quantity of said fastener attachment devices in a disoriented mass;
    b) means for vibrating the bowl to effect individual migration of said fastener attachment devices radially and circumferentially within the bowl toward and along said outer periphery of the bowl;
    c) an orientation module detachably mounted on the outer periphery of the bowl for vibration therewith and adapted to receive said migrating fastener attachment devices and operable to orient said fastener attachment devices for delivery to said utilization device in an acceptable orientation; and
    d) a singulator module operatively associated with said orientation module in a manner to be isolated from the vibration of said orientation module and adapted to receive said oriented fastener attachment devices from said orientation module in said acceptable orientation and propel them to said utilization device in said acceptable orientation.

2. The automated fastener feed system according to claim 1, wherein said orientation module is detachably mounted on said bowl in a non-adjustable relationship.

3. The automated fastener feed system according to claim 1, wherein said orientation module is monolithic and fabricated from tool steel.

4. The automated fastener feed system according to claim 1, wherein said orientation module includes means for delivering properly oriented fastener devices to said singulator module, and means for deflecting back into the bowl excess fastener devices presented to the orientation module.

5. The automated fastener feed system according to claim 1, wherein said orientation module includes a flat horizontal upper surface portion over which fastener devices move in a continual succession, and a slanted upper surface portion adjoining said flat horizontal upper surface portion and constituting a ramp for receiving fastener elements displaced from said flat horizontal upper surface.

6. The automated fastener feed system according to claim 1, wherein a mounting plate for supporting said orientation module is fixed on said bowl adjacent the outer periphery thereof, a discontinuity in said outer periphery forming a gap therein, and means cooperatively disposed between said mounting plate and said orientation module to position and retain said orientation module in said gap formed in the periphery of said bowl, whereby fastener devices migrate from said bowl when vibrated onto said orientation module.

7. The automated fastener feed system according to claim 4, wherein said means for delivering properly oriented fastener devices to said singulator module includes a slot formed longitudinally in said orientation module.

8. The automated fastener feed system according to claim 4, wherein said means for deflecting excess fastener devices comprises a laterally slated top surface portion of said orientation module adapted to receive said excess fastener devices and direct them back into the bowl.

9. The automated fastener feed system according to claim 4, wherein said means for delivering properly oriented fastener devices to said singulator module includes a cover plate secured to said orientation module spaced above the path traversed by said fastener devices sufficiently to admit properly oriented fastener devices thereunder while deflecting from said path fastener devices not properly oriented for delivery to said utilization device.

10. The automated fastener feed system according to claim 5, wherein said flat horizontal upper surface portion and said slanted upper surface portion are provided with an elongated slot having a width to accept the shanks of elongated fastener devices but not the heads thereof, and a cover plate detachably secured in spaced relation to said flat horizontal and slanted upper surfaces to retain the shanks of said fastener devices perpendicular to the long dimension of the slot.

11. The automated fastener feed system according to claim 1, wherein said singulator module is mounted in close association but spaced from said orientation module whereby said singulator module is isolated from direct vibration of said bowl transmitted to said orientation module.

12. The automated fastener feed system according to claim 1, whereby said singulator module includes an elongated monolithic body having an upper surface and a bottom surface, means operatively associated with said top surface for receiving and guiding therealong one or more fastener devices delivered by said orientation module, a laterally translatable bar mounted on said monolithic body and including a recess for receiving a fastener element, an orifice in the monolithic body through which a fastener may be ejected for delivery to said utilization device, and means operable to laterally translate said translatable bar to move said recess for receiving a fastener element into registry with said orifice.

13. The automated fastener feed system according to claim 12, wherein said singulator module has first and second end surfaces, said first surface is in close association with but spaced from said orientation module and said orifice is formed in said second end surface.

14. The automated fastener feed system according to claim 12, wherein said orifice is formed in said bottom surface.

15. The automated fastener feed system according to claim 12, wherein said means operable to laterally translate said translatable bar includes an air cylinder mounted on said monolithic body and a ram connected to said translatable bar operable upon admission of air under pressure into said air cylinder to effect translation of said translatable bar.

16. An automated fastener feed system for fastener attachment devices required to be delivered to a utilization device, comprising:
   a) a bowl having an outer periphery for receiving a quantity of said fastener attachment devices in a disoriented mass;
   b) means for vibrating the bowl to effect individual migration of said fastener attachment devices radially and circumferentially within the bowl toward and along said outer periphery of the bowl;
   c) an orientation module detachably mounted on the outer periphery of the bowl adapted to receive said migrating fastener attachment devices and operable to orient said fastener attachment devices for delivery to said utilization device in an acceptable orientation; and
   d) a singulator module operatively associated with said orientation module and adapted to receive said oriented fastener attachment devices from said orientation module in said acceptable orientation and propel them to said utilization device in said acceptable orientation,
   e) said orientation module comprising a monolithic tool steel body having opposed first and second end surfaces, opposed upper and bottom surfaces and opposed side surfaces intercepted by said opposed end surfaces, said opposed first and second end surfaces being angularly related by about 30 degrees, a portion of said upper surface being angularly related to the remaining portion of the upper surface by about 30 degrees, a flange coincident with one of said side surfaces projecting above a portion of said upper surface, a threaded bore in said bottom surface, and a pair of alignment bores in said bottom surface.

17. An automated fastener feed system for fastener attachment devices required to be delivered to a utilization device, comprising:
   a) a bowl having an outer periphery for receiving a quantity of said fastener attachment devices in a disoriented mass;
   b) means for vibrating the bowl to effect individual migration of said fastener attachment devices radially and circumferentially within the bowl toward and along said outer periphery of the bowl;
   c) an orientation module detachably mounted on the outer periphery of the bowl adapted to receive said migrating fastener attachment devices and operable to orient said fastener attachment devices for delivery to said utilization device in an acceptable orientation;
   d) a singulator module operatively associated with said orientation module and adapted to receive said oriented fastener attachment devices from said orientation module in said acceptable orientation and propel them to said utilization device in said acceptable orientation; and
   e) a main base plate, said means for vibrating said bowl, and said bowl, being mounted on said base plate, means for isolating said base plate from vibration generated by said means for vibrating the bowl, and a pedestal detachably mounted on said base and therewith isolated from vibration with said bowl, said singulator module being detachably mounted on said pedestal in close association but spaced from said orientation module whereby said singulator module is isolated from vibration of said orientation module.

18. An automated fastener feed system for fastener attachment devices required to be delivered to a utilization device, comprising:
   a) a bowl having an outer periphery for receiving a quantity of said fastener attachment devices in a disoriented mass;
   b) means for vibrating the bowl to effect individual migration of said fastener attachment devices radially and circumferentially within the bowl toward and along said outer periphery of the bowl;
   c) an orientation module detachably mounted on the outer periphery of the bowl adapted to receive said migrating fastener attachment devices and operable to orient said fastener attachment devices for delivery to said utilization device in an acceptable orientation;
   d) a singulator module operatively associated with said orientation module and adapted to receive said oriented fastener attachment devices from said orientation module in said acceptable orientation and propel them to said utilization device in said acceptable orientation; and
   e) wherein said system includes a main base plate, said means for vibrating said bowl is mounted on said base plate, a pedestal mounted on said main base plate and having a singulator module mounting plate on the upper end thereof, alignment means on said mounting plate, complementary alignment means on said singulator module, and a threaded thumb screw rotatably mounted on said singulator module and digitally manipulable to detachably engage a complementarily threaded bore in said mounting plate, whereby said insulation module may quickly and easily without tools be detachably secured to said mounting plate.

* * * * *